United States Patent [19]

Krishnan et al.

[11] Patent Number: 4,673,699
[45] Date of Patent: Jun. 16, 1987

[54] FLAME RETARDANT MOLDING COMPOSITIONS

[75] Inventors: Sivaram Krishnan, Pittsburgh, Pa.; Ulrich R. Grigo, Kempen, Fed. Rep. of Germany

[73] Assignee: Mobay Corporation, Pittsburgh, Pa.

[21] Appl. No.: 672,511

[22] Filed: Nov. 19, 1984

[51] Int. Cl.$^4$ ............................................. C08K 5/34
[52] U.S. Cl. .......................................... 524/94; 524/89
[58] Field of Search ................................... 524/89, 94

[56] References Cited

U.S. PATENT DOCUMENTS

| | | | |
|---|---|---|---|
| 3,357,942 | 12/1967 | Jackson, Jr. et al. | 260/45.7 |
| 3,632,544 | 1/1972 | Boyer | 260/30.4 |
| 3,775,367 | 11/1973 | Nouvertne | 260/45.9 |
| 3,784,509 | 1/1974 | Dotson et al. | 524/94 |
| 3,821,162 | 6/1974 | Dexter | 260/45.8 |
| 3,828,003 | 8/1974 | Yamazaki et al. | 260/45.75 |
| 3,836,490 | 9/1974 | Bockmann et al. | 260/18 |
| 3,855,277 | 12/1974 | Fox | 260/45.7 |
| 3,873,567 | 3/1975 | Cyba | 524/89 |
| 3,883,476 | 5/1975 | Dexter | 260/45.8 |
| 4,056,504 | 11/1977 | Grundmeier et al. | 524/537 |
| 4,115,333 | 9/1978 | Phipps et al. | 524/537 |
| 4,208,489 | 6/1980 | Schmidt et al. | 525/146 |
| 4,339,383 | 7/1982 | Wehner et al. | 524/94 |
| 4,366,276 | 12/1982 | Freitag et al. | 524/414 |
| 4,374,220 | 2/1983 | Sonnenberg | 524/94 |
| 4,506,047 | 3/1985 | Witman et al. | 524/89 |
| 4,552,911 | 11/1985 | Cohnen | 524/94 |

FOREIGN PATENT DOCUMENTS

| | | |
|---|---|---|
| 0103922 | 3/1984 | European Pat. Off. . |
| 0140120 | 5/1985 | European Pat. Off. . |
| 2937877 | 4/1980 | Fed. Rep. of Germany . |
| 1273071 | 5/1972 | United Kingdom . |
| 1400728 | 9/1972 | United Kingdom . |
| 1287934 | 9/1972 | United Kingdom . |
| 1370744 | 10/1974 | United Kingdom . |

OTHER PUBLICATIONS

Morrison et al.; Organic Chemistry; Allyn and Bacon, Inc.; 3rd Edition; 1973; pp. 321–323, 328.
Noller; Chemistry of Organic Compounds; W. B. Saunders Co.; 1957; 2nd Edition; p. 421.

*Primary Examiner*—Lewis T. Jacobs
*Attorney, Agent, or Firm*—Gene Harsh; Joseph C. Gil; Aron Preis

[57] ABSTRACT

Novel molding compositions comprising a polycarbonate resin and the halogenated reaction product of phthalic anhydride and aniline are characterized in their improved flame resistance and are useful for the preparation of molded articles.

2 Claims, No Drawings

FLAME RETARDANT MOLDING COMPOSITIONS

FIELD OF THE INVENTION

The present invention is directed to flame retardant thermoplastic compositions and more particularly to N-(polyhalophenyl) phthalimides as flame retarding agents in molding compositions comprising polycarbonate resins.

BACKGROUND OF THE INVENTION

The need for flame resistant polymeric compositions resulted in the development of a field of special technology and a relevant body of knowledge. Among the successful developments, particular mention might be made of alkali metal salts which incorporation in polycarbonates was reported in U.S. Pat. Nos. 3,775,367 and 3,836,490 and in British Pat. No. 1,370,744. Improved flammability of polycarbonate resins upon the addition of organic chlorine compounds have been disclosed in U.S. Pat. No. 3,357,942, in DOS Nos. 2,122,300, 2,153,101 and 2,243,226. German published specification DOS No. 2,013,496 is noted to mention tetrachlorophthalic anhydride as a suitable flame retarding agent in polycarbonates.

Further of interest in this connection is U.S. Pat. No. 4,208,489 which discloses certain tetrahalogenophthalimides as flame retarding agents in polycarbonate compositions, and U.S. Pat. No. 3,873,567 and British Patent Specification No. 1,287,934, both disclosing imido compounds suitable as flame retarding additives in polymeric compositions. It is noted that U.S. Pat. No. 3,873,567 discloses a wide variety of bromine substituted imides suitable as flame retarding agents in polymeric resins including polycarbonates yet, the disclosed compounds have generally a high melting temperature which renders them insoluble in polycarbonate resins at the processing temperatures of this resin.

SUMMARY OF THE INVENTION

The present invention relates to a novel molding composition comprising a polycarbonate resin and a compound which is a halogen carrying product of a condensation reaction of an aniline and phthalic acid anhydride. The compound which is characterized in its relatively low melting temperature and its good solubility in polycarbonate resins is particularly suitable as a flame retarding agent therein. Thermoplastic molding compositions comprising N-(polyhalophenyl) phthalimide and thermoplastic polycarbonate resins characterized in their improved flame retardancy are disclosed.

DETAILED DESCRIPTION OF THE INVENTION

The imide compounds of the present invention are characterized in that their structural formula contains at least one phthalic acid derivative bonded directly to at least one aniline derivative, and in that at least one of said derivatives carries at least one halogen substituent and further in that their melt temperature is below 300° C., preferably below 275° C. The compounds of the invention are also characterized by their compatibility with and solubility in, polycarbonates at the processing temperatures of these resins. These attributes result in clear moldings having good color and transparency and virtual freedom from haze. Preferably, these compounds are at least substantially soluble in polycarbonate resins. The preferred halogen is chlorine and most preferably, the halogen substituent is carried on the aniline derivative.

In the most preferred embodiments, the imide compounds are further characterized in that the at least one phthalic acid derivative too is halogen-substituted preferably the halogen substituent is chlorine.

The imide compounds which may be used according to the present invention advantageously have one of the general formulae

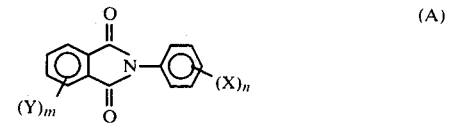 (A)

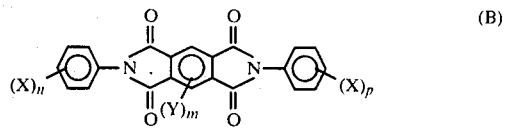 (B)

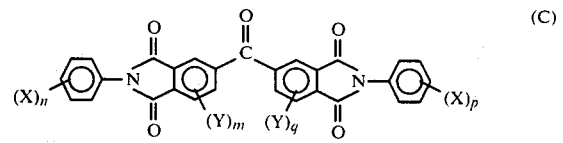 (C)

wherein X and Y independently are Cl or Br, preferably chlorine and m, n, p and q independently are integers of from 0 to 5 and n+m+p+q is at least 1. Generally, the preparation of the imides of the invention is carried out by reacting a suitable phthalic acid anhydride with a suitable aniline in an inert solvent. The phthalic acid anhydride suitable for the preparation of the compounds of the invention conforms to

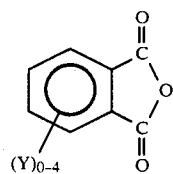

wherein Y is either chlorine or bromine, preferably chlorine. Specific examples include 1,4 dihalophthalic acid anhydride, 1,5 dihalophthalic acid anhydride, 1,6-dihalophthalic acid anhydride, 5,6 dihalophthalic acid anhydride, 1,4,5 trihalophthalic acid anhydride, 1,4,5,6 tetrahalophthalic acid anhydride. Preferably the halogen substituent is a chlorine atom. It is to be understood that the above list is representative of the type of phthalic acid anhydrides which are suitable in the present context and that the list is not in any way limiting the scope of the invention.

The aniline suitable in the present context is either substituted or unsubstituted.

In the embodiments entailing halogen substituted aniline, chlorine is a preferred substituent. The halogen substituted aniline may carry more than one halogen substituent preferably three substituents. The aniline may also be substituted by any of $C_1$–$C_4$-alkyl radicals, preferably ethyl radicals. In these embodiments containing alkyl substituted aniline, the halogen substituent is preferably carried on the phthalic acid anhydride derivative.

The process for the preparation of these compounds of the invention may be carried out by placing the desired reactants in an appropriate apparatus along with a suitable, substantially inert, organic solvent—preferably acetic acid—and heating to the reflux temperature of the solvent. The reaction is allowed to proceed for a predetermined time which is calculable from the amount of water formed and the rate of its removal. The reaction product is recovered after a cooling down period by any of the known conventional means, i.e., filtration, suction, evaporation, etc.

A detailed procedure for the preparation of imides suitable in the present invention is described in Examples 1-4.

In the present context, polycarbonate resins may have a molecular weight (weight average) from about 10,000 to from about 200,000 preferably from about 20,000 to about 80,000, and may have a melt flow rate, per ASTM D-1238 at 300° C., of from about 1 to about 24 gm/10 minutes, preferably from about 2 to about 6 gm/10 minutes.

In the present context, dihydroxy compounds suitable for the preparation of the polycarbonates of the invention may conform to the structural formulae (1) or (2)

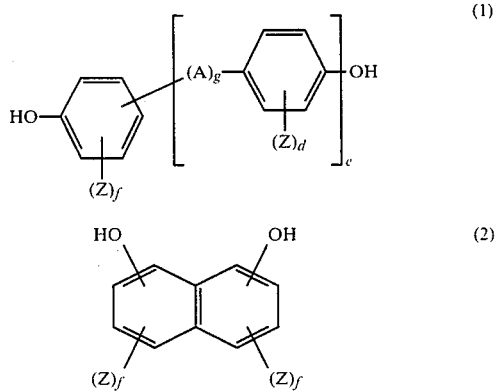

wherein

A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, a carbonyl group, an oxygen atom, a sulfur atom, or —SO— or —SO$_2$— radical; a radical of the general formula

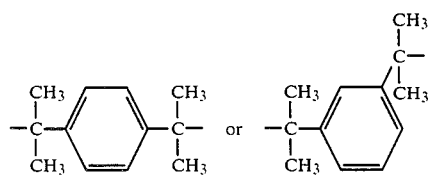

g denotes the number 0 or 1;
e denotes the number 0 to 1;
Z denotes F, Cl or Br or a C$_1$–C$_3$ alkyl and if several Z radicals are substituents in one aryl radical, they may be identical or different;
d denotes an integer of from 0 to 4; and
f denotes an integer of from 0 to 3.

Among the useful dihydroxy compounds in the practice of the invention are hydroquinone, resorcinol, bis-(hydroxyphenyl)-alkanes, bis-(hydroxyphenyl)-cycloalkanes, bis-(hydroxyphenyl)-ethers, bis-(hydroxyphenyl)-ketones, bis-(hydroxyphenyl)-sulfoxides, bis-(hydroxyphenyl)-sulfones and α,α-bis-(hydroxyphenyl)diisopropylbenzenes. These and further suitable aromatic dihydroxy compounds are described, for example, in U.S Pat. Nos. 3,028,365; 2,999,835; 3,148,172; 3,271,368; 2,991,273; 3,271,367; 3,280,078; 3,014,891; and 2,999,846 (all incorporated herein by reference), in German Offenlegungsschriften (German Published Specifications) Nos. 1,570,703; 2,063,050; 2,063,052; 2,211,956 and 2,211,957, in French Patent Specification No. 1,561,518 and in the monograph, H. Schnell, *Chemistry and Physics of Polycarbonates*, Interscience Publishers, New York, 1964. Further examples of suitable dihydroxy compounds are 2,2-bis-(4-hydroxyphenyl)-propane (bisphenol A), 2,4-bis-(4-hydroxyphenyl)-2-methylbutane, 1,1-bis-(4-hydroxyphenyl)-cyclohexane, α,α-bis-(4-hydroxyphenyl)-p-diisopropylbenzene, 2,2-bis-(3-chloro-4-hydroxyphenyl)propane, hydroxybenzophenone and 4,4'-sulfonyl diphenol.

The most preferred dihydroxy compound is 2,2-bis-(4-hydroxyphenyl)-propane (bisphenol A).

The polycarbonates of the invention may entail in their structure units derived from one or more of the suitable dihydroxy compounds.

The preparation of polycarbonate resins may be carried out in accordance with any of the processes known in the art, for example by the interfacial polycondensation process, polycondensation in a homogeneous phase or by transesterification. The suitable processes and the associated reactants, catalysts, solvents and conditions have been disclosed in the literature and in general are described in the above-mentioned monograph by H. Schnell.

In the preparation of the polycarbonate resins of the invention, monofunctional reactants such as monophenols may be used in order to limit their molecular weights. Also, in their preparation branching agents may be employed. Branching may be obtained by the incorporation, in the respective processes, of small amounts, preferably of between about 0.5 and 2.0 mol % (relative to the dihydroxy compounds employed), of compounds having three or more functionalities, especially compounds having three or more phenolic hydroxyl groups.

Polycarbonates of this type are described, for example, in German Offenlegungsschriften (German Published Specifications) Nos. 1,570,333: 1,595,762; 2,116,974 and 2,113,347, British Specification No. 1,079,821 and U.S. Pat. No. 3,544,514 (all incorporated herein by reference).

Some examples of compounds with three or more than three phenolic hydroxyl groups which can be used are phloroglucinol, 4,6-dimethyl-2,4,6-tri-(4-hydroxyphenyl)-heptane, 2,4,6-tri-methyl-2,4,6-tri-(4-hydroxyphenyl)-heptane, 1,4,5-tri-(4-hydroxyphenyl)-benzene, 1,1,1-tri-(4-hydroxyphenyl)-ethane, tri-(4-hydroxyphenyl)-phenylmethane, 2,2-bis-[4,4-bis-(4-hydroxyphenyl)-cyclohexyl]-propane, 2,4-bis-(4-hydroxyphenylisopropyl)-phenol, 2,6-bis-(2-hydroxy-5'-methylbenzyl)-4-methylphenol, 2-(4-hydroxyphenyl)-2-(2,4-dihydroxyphenyl)-propane, hexa(4-(4-hydroxyphenylisopropyl)-phenyl)-orthotere-phthalic acid ester, tetra-(4-hydroxyphenyl)-methane, tetra-(4-(4-hydroxyphenylisopropyl)-phenoxy)-methane and 1,4-bis-((4',4''- dihydroxytriphenyl)-methyl)benzene. Some of the other trifunctional compounds are 2,4-dihydroxy-benzoic acid, trimesic acid, cyanuric chloride and 3,3-bis-(4-hydroxyphenyl)-2-oxo-2,3-dihydroindole.

The imide compounds of the invention are suitable as flame retarding agents in thermoplastic compositions generally. In particular, they are useful in compositions comprising polycarbonate resins such as polycarbonate alloys with ABS (acrylonitrile-butadiene styrene) or with thermoplastic polyesters such as poly(ethylene terephthalate) and poly(butylene terephthalate). Thermoplastic resins generally and thermoplastic polyester in particular are known in the art and are readily available in commerce.

The invention is further illustrated but is not intended to be limited by the following examples in which all parts and percentages are by weight unless otherwise specified.

EXAMPLE 1

In a 1000 ml 3-necked agitatable flask equipped with reflux condenser and $N_2$ pad were charged 57.2 gms (0.2 mole) of tetrachlorophthalic anhydride, 66.0 gms (0.2 mole) of tribromoaniline, and 300 ml of acetic acid and the reaction flask heated to 119° C. and maintained at that temperature overnight. About 150 ml of acetic acid were then removed and the reaction flask then let to cool down to room temperature. The solid precipitate was filtered and washed with fresh cold acetic acid (2×) and with water (3×) and then boiled in a dilute solution of $NaHCO_3$ (600 ml) to neutralize the acetic acid. The solids were again filtered and washed with water (3×). The dry residue (94.9 gms) is characterized by its structure

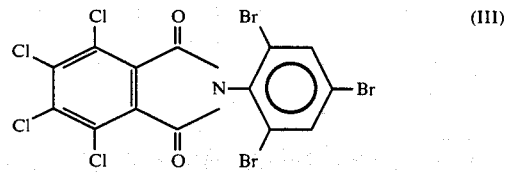

and by its melting temperature, 196°–201° C. The compound was determined to contain 2.24% N, 38.73% Br, and 25.88% Cl (compare with the corresponding theoretical values 2.34, 40.13 and 23.75).

EXAMPLE 2

The preparation of several species of imide compounds suitable in the practice of the invention was carried out following a largely similar procedure: An imide compound conforming to:

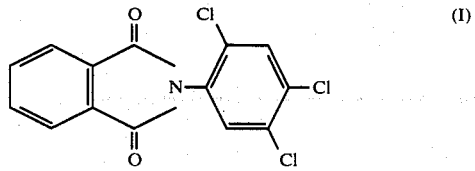

was prepared by reacting 74 gms of phthalic anhydride with 110.25 gms of 2,4,5-trichloroaniline in 736 ml of acetic acid. The product was characterized by its melting temperature 206°–207° C. Its analysis indicated 4.29% of nitrogen and 32.66% of chlorine.

EXAMPLE 3

Similarly, upon a reaction of 37 gms (0.25 moles) of phthalic anhydride with 82.5 gms (0.25 moles) of 2,4,6-tribromoaniline in 450 ml of acetic acid, the imide conforming to

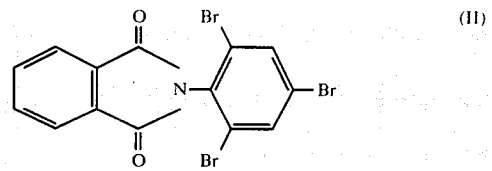

was prepared, characterized in that its melt temperature was about 188°–189° C. and in that its chemical analysis indicated 3.21% N, 56.31% Br.

EXAMPLE 4

Also prepared was an imide compound conforming to

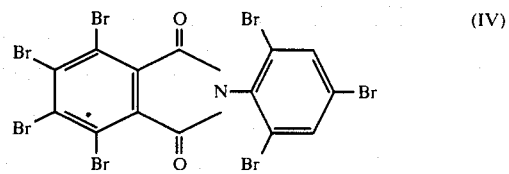

upon a reaction of 46.4 gm (0.1 mole) of tetrabromophthalic anhydride with 22.0 gm (0.1 mole) of tribromoaniline in 300 gm of acetic acid. The material was characterized and found to contain 1.47% of nitrogen and 71.08% bromine and to have a melt temperature of 216°–218° C.

The preparation of some preferred compounds within the scope of the invention has been discussed above. Other species in accordance with the invention may be prepared following analogous procedures.

The imide compounds of the invention are characterized in that their melt temperature is below 300° C., preferably below 275° C. Preferably, these compounds are substantially soluble in polycarbonate resin and they are therefore advantageously used in the preparation of flame retardant polycarbonate compositions. Due in part to their higher molecular weight, the compounds of the invention are less volatile than are prior art imide compounds such as N-methyltetrachlorophthalimide. This lower volatility is an added attractive feature of the compounds of the invention. Further, the compounds of the invention are indicated to provide better color than do prior art imide compounds. In terms of UV stability, the imido compounds derived from tetrachlorophthalimide show an advantage over the brominated counterparts.

EXAMPLE 5

The UV stability of the compounds of the invention was determined as described below. Compositions comprising polycarbonate resin and 0.5% (by weight) of the imides of the invention were prepared and their discoloration upon exposure to R.S. sunlamp for 300 hours was determined and compared to corresponding non-exposed control samples, as summarized below.

| Imide compound based on: | Base Resin A[1] | | | Base Resin B[2] | | |
|---|---|---|---|---|---|---|
| | YI[6] Control | YI after exposure | Diff. | YI Control | YI after exposure | Diff. |
| TBPA[3] + aniline | 13.9 | 38.7 | 24.8 | 5.6 | 33.0 | 27.4 |
| TBPA + 2,6-diethylaniline | 13.3 | 79.2 | 65.9 | 5.0 | 73.0 | 68.0 |
| TCPA[4] + aniline | 13.7 | 25.2 | 11.5 | 5.9 | 13.9 | 8.0 |
| TCPA + 2,6-diethylaniline | 13.0 | 22.8 | 9.8 | 4.4 | 13.2 | 8.8 |
| PA[5] + 2,6-tribromoaniline | 14.1 | 31.6 | 17.5 | 4.8 | 15.4 | 10.6 |

[1]Base resin A contained Merlon M-40, a homopolycarbonate of bisphenol A having a melt flow index per ASTM D-1238 of about 6–11.9 gm/10 min; 0.25% cryolite and 0.15% Teflon.
[2]Base resin B contained a branched polycarbonate Merlon M-3119 and 0.1% of potassium perfluorobutane sulfonate such as is disclosed in U.S. Pat. No. 3,775,367.
[3]TBPA denotes tetrabromophthalic anhydride
[4]TCPA denotes tetrachlorophthalic anhydride
[5]PA denotes phthalic anhydride
[6]YI denotes Yellowness index.

As is indicated by the results the imide compounds which contain chlorine substituents discolor less than do their bromine analogs. This difference is particularly apparent upon a comparison between N-(2,6-diethylphenyl) tetrachlorophthalimide and its bromine counterpart. It should be noted that bromine substituents in the N-phenyl portion of the molecule causes less discoloration than do bromine substituents in the phthalic ring.

EXAMPLE 6

Imide compounds within the scope of the invention were used in preparing polycarbonate molding compositions. The preparation of the compositions, the components of which are noted below, entailed extrusion using a 1½″ Waldron Hartig extruder (2.75:1 screw, with mixing pins, 20-40-60-20 screen pack) at a temperature profile of:

| | Set (°F.) | Reading (°F.) |
|---|---|---|
| Front zone | 470–500 | 500–525 |
| Middle zone | 480–495 | 495–520 |
| Rear zone | 480–500 | 520–535 |
| Die | 500–520 | 500–520 | and a screw speed of 60 rpm.

Flammability test specimens were molded at a temperature profile (rear to front) of 575°, 575°, 520° F., mold temperature 150° F., at 35 second cycles, 1300 psi initial pressure, 1100 psi secondary injection pressure. The impact strength test specimens were molded similarly except that the corresponding pressures were 900 and 750 psi.

In preparing the compositions described below the indicated components were:

Branched polycarbonate—Merlon M-3119, a branched polycarbonate based on bisphenol A and characterized in that its melt flow index per ASTM D-1238 (300° C.-1200 gm) is about 1.5-2.5 g/10 min, a commercial product of Mobay Chemical Corporation.

Linear polycarbonate—Merlon M-40, a homopolycarbonate based on bisphenol A, characterized in that its melt flow rate in accordance with ASTM D-1238 (300° C.-1200 gm load) is about 6-11.9 gm/10 min., a commercial product of Mobay Chemical Corporation.

Salt—potassium perfluorobutane sulphonate such as is disclosed in U.S. Pat. 3,775,367. 0.1 phr of salt was added where indicated.

PTFE—polytetrafluoroethylene, Teflon 6C, a commercial product of E. I. Dupont. 0.15 phr of PTFE was added where indicated.

Cryolite—sodium aluminum hexafluoride ($Na_3AlF_6$). 0.25 phr of Cryolite was added where indicated.

The imide compounds used in the Examples, structures I through IV—see Examples 1 through 4—have been identified above in terms of their structure, chemical and physical characteristics and method of preparation. All the imido compounds were added at a level of 0.5 phr.

TABLE 1

| Polycarbonate[1] | B | L | L | B | L | L | L | B | L | L | B |
|---|---|---|---|---|---|---|---|---|---|---|---|
| Melt flow rate gm/10 min. | | | | 2.3 | 9.8 | 10.2 | 10.4 | 3.3 | 9.8 | 10.4 | 3.4 |
| Imide compound | I | I | I | II | II | III | III | III | IV | IV | IV |
| Salt | + | | + | + | | | + | + | | + | + |
| PTFE | | + | + | | + | + | + | | + | + | |
| Cryolite | | + | | | + | + | | + | | + | |
| Impact strength ⅛″ Izod, notched J/m | 790 | 177 | | 766 | 200 | 840 | 840 | 108 | 778 | 750 | 803 |
| Flame retardance UL-94 (average burn time, sec) | | | | | | | | | | | |
| ⅛″ | V-0 | V-0 | V-0 | V-0 | V-0 | V-0 | V-0 | V-0 | V-0 | V-0 | V-0 |
| | (2.2) | (0.5) | (1.0) | (1.5) | (1.0) | (0.5) | (0.6) | (0.6) | (0.1) | (0.5) | (0.6) |
| 1/16″ | V-0 | V-0 | V-0 | V-0 | V-0 | V-0 | V-0 | V-0 | V-0 | V-0 | V-0 |
| | (3.2) | (3.8) | (4.5) | (3.8) | (2.3) | (1.4) | (3.4) | (3.3) | (2.6) | (2.9) | (3.6) |
| 5 V | pass | pass | fail | pass | fail | fail | fail | fail | fail | fail | fail |

[1]L = linear
B = branched

The thermoplastic compositions of the present invention may contain in addition to the resinous component and the imide compounds any of the conventional additives known in the art such as glass fibers, pigments, dyes, UV stabilizers, thermal stabilizers, mold release agents and fillers. These additives may be blended with the resinous components of the invention in known mixing devices such as kneaders, extruder mills and the like.

EXAMPLE 7

The efficacy of the compounds of the invention in improving the flame retardance of glass reinforced thermoplastic polyester was determined. The composition of Example 7 consisted of polyethylene terephthalate resin (Tenite 7871 from Kodak—intrinsic viscosity 0.65), 30% of weight of glass fibers, 11% of N-(2,6-diethylphenyl) tetrabromophthalimide about 3.5% of antimony oxide and about 8.4% of Acryloid KM 330 which is an interpolymer composite based on acrylate core and a grafted methyl methacrylate, a commercial product of Rohm & Haas. The composition further contained small amounts of conventional thermal and hydrolysis stabilizers. The composition, containing about 5.9% bromine was compared to a corresponding prior art composition i.e. control, differing therefrom in that it contained 10.5% - corresponding to about 7% bromine from -1,2-bis-(tetrabromophthalimido)-ethane, having a melting point higher than 300° C. corresponding to

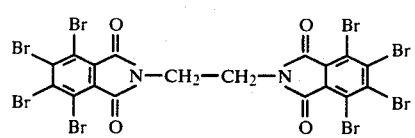

(Saytex BT-93 from Saytex Inc.) instead of the 11% imide used in the composition of Example 7. The resulting comparison between the control composition and the compositions containing the imide of the invention indicated substantial equivalence in terms of flame retardancy and physical properties. The table below summarizes the comparison between these compositions.

|  | Control | Example 7 |
|---|---|---|
| Impact strength, Izod |  |  |
| j/m notched | 92.3 | 92.9 |
| unnotched | 856 | 972 |
| Flexural Modulus, GPa | 9.83 | 9.84 |
| Flexural strength, MPa | 203 | 213 |
| Tensile strength, MPa | 133 | 138 |
| Heat Deflection Temper- | 226 | 126 |
| ature, at 264 psi, °C. |  |  |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic molding composition comprising an aromatic polycarbonate resin and an imide compound which is characterized in that its melt temperature is below 300° C. and conforms to

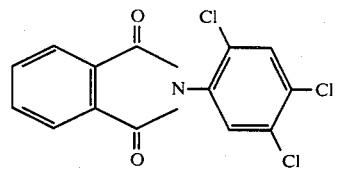

said molding composition rating at least V-0 for 1/8" specimens in accordance with UL-94 flame retardance test.

2. A thermoplastic molding composition comprising an aromatic polycarbonate resin and imide compound which is characterized in that its temperature is below 300° C. and in that its structure conforms to

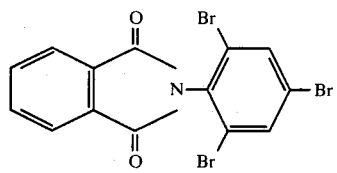

said molding composition rating at least V-0 for 1/8" specimens in accordance with UL-94 flame retardance test.

* * * * *